E. T. THAYER.
TROLLEY WHEEL.
APPLICATION FILED MAR. 29, 1921.
1,405,074.
Patented Jan. 31, 1922.
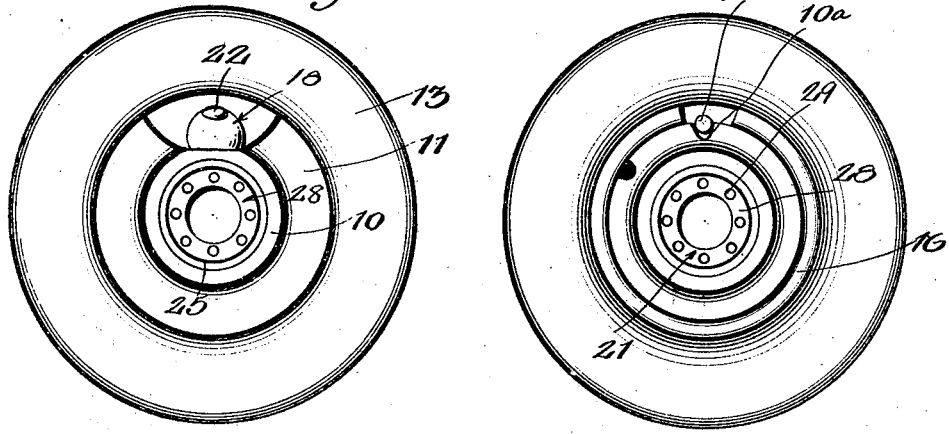
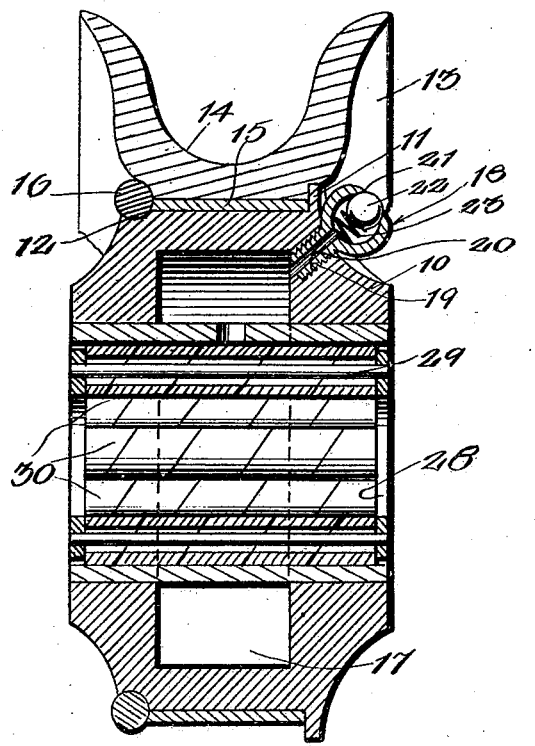
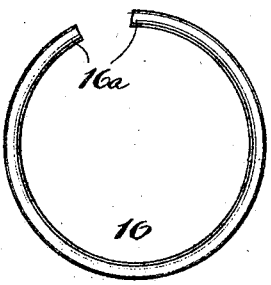
WITNESSES
INVENTOR
E. T. THAYER,
BY
ATTORNEYS

UNITED STATES PATENT OFFICE.

ELLIS TODD THAYER, OF CHARLESTON, WEST VIRGINIA.

TROLLEY WHEEL.

1,405,074.  Specification of Letters Patent.  Patented Jan. 31, 1922.

Application filed March 29, 1921. Serial No. 456,684.

*To all whom it may concern:*

Be it known that I, ELLIS TODD THAYER, a citizen of the United States, and a resident of Charleston, in the county of Kanawha and State of West Virginia, have invented certain new and useful Improvements in Trolley Wheels, of which the following is a specification.

My invention relates to trolley wheels and has for its object to provide a trolley wheel which is extremely simple and durable in construction, smooth, even running, and reliable in operation and easy and inexpensive to manufacture and repair.

Another object is to provide a trolley wheel of this character which is so organized as to possess in assembly all of the features of a unitary construction and at the same time provide for the easy removal and replacement of those parts subject to the most wear.

Other objects and advantages reside in certain novel features of the construction, arrangement and combination of parts which will be hereinafter more fully described and particuarly pointed out in the appended claims, reference being had to the accompanying drawing forming a part of this specification, in which—

Figure 1 is an elevational view of one side of the wheel,

Figure 2 is a similar view of the other side,

Figure 3 is a sectional view taken diametrically through the wheel, and

Figure 4 is a detail view in elevation of the retaining ring.

Referring to the drawings, wherein for the sake of illustration, is shown the preferred embodiment of the invention, the numeral 10 designates the body portion of the wheel. Along one of the marginal edges of its outer periphery the body portion is provided with an annular flange 11 and along the other marginal edge of its outer periphery there is provided an arcuate groove 12 which extends entirely around the periphery. A rim 13 is carried by the body portion and has its periphery provided with the usual groove 14. Preferably a bushing 15 of hard steel is interposed between the rim and the body portion.

In assembling the rim on the body portion it is slid endwise thereon until it abuts at one side the annular flange 11. The other side of the rim is then just clear of or coincident with the innermost portion of the arcuate groove 12. A retaining ring 16 is then snapped into position in the groove 12 and functions to releasably maintain the rim on the body portion. The retaining ring 16 is constructed of metal of suitable resilience to bind it in the groove 12 and against the rim 13 and its ends $16^a$ are spaced from each other a slight distance in assembly to facilitate the removal of the ring by a punch or similar tool. Means is provided for securing the body portion and the rim against relative rotary movement and may comprise a notch $10^a$ provided in a body portion and a pin $13^a$ fixed to the rim and projecting into the notch between the spaced ends $16^a$ of the retaining ring as clearly shown in Figure 2.

The body portion 10 is provided with an annular groove 17 which extends circumferentially thereof and which opens to the inner periphery of the body portion. The groove 17 constitutes a chamber for the reception of the lubricant. If the lubricant be oil it is preferably introduced through an oil cup designated generally at 18 which includes an externaly threaded tubular body portion 19 engaged and extending in a suitable opening 20 provided in the body portion. The opening 20 leads from one of the lateral faces of the body portion to the lubricant chamber 17 and is inclined with respect to the body portion and consequently the oil cup is also inclined. The oil cup is provided with an inlet opening 21 normally closed by a ball valve 22 contained within the oil cup and urged to close the opening by means of a coil spring 23. When the oil is to be introduced the ball valve 22 is pressed inwardly against the tension of the coil spring 23, the oil then flowing around the ball and through the tubular body portion into the lubricant chamber. The ball valve may be operated by the spout of the oil container.

A bushing 25 is arranged within the annular body portion and is provided with an opening 26 leading therethrough into the lubricant chamber. Roller bearings designated generally at 27 are arranged within the bushing and include cage rings and bars 28 and 29 respectively and roller bearings 30 associated therewith. The roller bearings directly engage the axle (not shown). The roller bearings and the bushing 25 constitute the hub of the trolley wheel.

In operation, the lubricant contained in the chamber or reservoir 17 feeds through the opening 26 to the roller bearings under the action of the roller bearings themselves but the centrifugal force due to the rotation of the wheel cannot in this organization cause an excessive feed of the lubricant as it tends to maintain the lubricant in the chamber 17. After the rim has worn to such an extent as to be no longer efficient it is not necessary to discard the wheel but a new rim may be placed thereon by simply removing the split retaining ring 16, placing a new rim thereon and replacing the retaining ring. The hard steel bushing 15 protects the body portion in the event that the rim wears entirely through or breaks before it is replaced.

I claim:—

1. A trolley wheel comprising a body portion having an annular flange along one of the marginal edges of its outer periphery and an arcuate groove extending entirely around the other marginal edge thereof, a rim carried by the body portion, a bushing interposed between the rim and the body portion, a split resilient retaining ring adapted to be seated in the arcuate groove and cooperating with the annular flange to retain the rim on the wheel, means for securing said rim and said body portion against relative rotary movement, said body portion having an annular groove opening to its inner periphery and constituting a lubricant chamber, means for introducing lubricant into said chamber including an oil cup having an inlet opening and a spring closed valve therefor, a bushing arranged within the body portion and having an opening leading therethrough into the lubricant chamber and roller bearings arranged within the bushing.

2. A trolley wheel comprising a body portion having an annular flange along one of the marginal edges of its outer periphery and an arcuate groove extending entirely around the other marginal edge thereof, a rim carried by the body portion, a split resilient retaining ring adapted to be seated in the arcuate groove and cooperating with the annular flange to retain the rim on the wheel, means for securing said rim and said body portion against relative rotary movement, a bushing arranged within the body portion and roller bearings arranged within the bushing.

3. A trolley wheel comprising a body portion having an annular flange along one of the marginal edges of its outer periphery and an arcuate groove extending entirely around the other marginal edge thereof, a rim carried by the body portion, a bushing interposed between the rim and the body portion, a split resilient retaining ring adapted to be seated in the arcuate groove and cooperating with the annular flange to retain the rim on the wheel, means for securing said rim and said body portion against relative rotary movement, said body portion having an annular groove opening to its inner periphery and constituting a lubricant chamber, means for introducing lubricant into said chamber, a bushing arranged within the body portion and having an opening leading therethrough into the lubricant chamber and roller bearings arranged within the bushing.

4. A trolley wheel comprising a body portion, a rim carried by said body portion, means for releasably maintaining said rim on said body portion including a split resilient retaining ring, a bushing arranged within said body portion and roller bearings arranged within said bushing.

5. A trolley wheel comprising an annular body portion having an annular flange around one of the marginal edges of its outer periphery and having an arcuate groove extending entirely around the other marginal edge thereof, a rim carried by the body portion and a split resilient ring seated in the arcuate groove and engageable with the rim and cooperating with the annular flange to releasably secure the rim on the body portion.

ELLIS TODD THAYER.